United States Patent Office 2,877,166
Patented Mar. 10, 1959

2,877,166

DYE CYANIDES AND PHOTOSENSITIVE COMPOSITIONS CONTAINING SAME

Lyman Chalkley, Prince Georges County, Md.

No Drawing. Application April 2, 1957
Serial No. 650,085

11 Claims. (Cl. 204—158)

This invention relates to new dye cyanides, and more specifically to 4,4'-bis-dialkylamino-2''-halogen-triphenyl-acetonitriles and to photosensitive compositions containing same. The new compounds have the following general chemical formula:

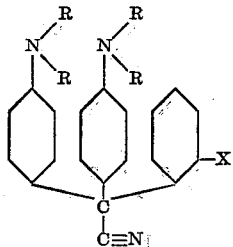

wherein R is a lower alkyl radical such as methyl or ethyl and X is a halogen such as chlorine or bromine.

Specific examples of such compounds are 4,4'-bis-dimethylamino-2''-chloro-triphenylacetonitrile, also referred to hereinafter as setoglaucine cyanide, 4,4'-bis-dimethylamino-2''-bromo-triphenylacetonitrile, 4,4'- bis - diethylamino-2''-chloro-triphenylacetonitrile, and 4,4'-bis - diethylamino-2''-bromo-triphenylacetonitrile.

An object of the present invention is to provide new colorless dye cyanides which in the presence of a suitable activator produce a strong color on exposure to ultraviolet energy.

Another object of the invention is to provide photosensitive compositions that do not require the use of acids to prevent fading of the color produced by exposure to ultraviolet light.

Aminotriphenylmethane dye cyanides halogenated at the 3 position in the phenyl nucleus next to a para amino group have been disclosed in my prior patents, 2,366,179 and 2,441,561. However, strongly colored solutions could not be obtained by irradiation of these halogenated compounds, and even the amount of color that was formed varied widely with solution conditions. Accordingly, these halogenated compounds have not been useful in photosensitive systems for actinometric and photographic applications. The addition of halogen constituents at the 3 position in the manner described, was found to subtract materially from the intensity of color that could be formed from solutions of these compounds as compared to solutions of equal molecular strength of corresponding unsubstituted dyes. In contrast, the halogenated dye cyanides of the present invention, in the presence of suitable photoactivators, yield upon irradiation with ultraviolet energy a color at least as strong as that obtained from malachite green cyanide or brilliant green cyanide. Thus, with a halogen atom in the ortho position of a phenyl residue there is no reduction in the intensity of color produced by irradiation such as occurs with the previously known halogenated compounds.

The halogenated dye cyanides of the present invention as compared with the corresponding unhalogenated compounds, such as malachite green or brilliant green cyanides, and with analogs halogenated in other positions, further have the uniquely valuable property of forming photosensitive systems in which the color formed on irradiation does not readily fade in the dark. For example, alcoholic solutions of malachite green cyanide or of brilliant green cyanide while forming strong colors on irradiation fade completely within a few hours. While this property of fading is useful for some purposes, as in radiation intensity meters and the like, it has for most purposes of actinometry and photography been undesirable and various means have been developed to prevent such fading. The usual means is to add an acid, such as hydrochloric acid to systems containing these cyanides, if they are to be used for actinometry. My Patent Number 2,528,496 discloses the use of carboxylic acids for prevention of fading. However, the addition of acids imposes many problems. Some acids are highly corrosive and may damage apparatus in which the acidified materials are used. Many of the acids are volatile and sensitized sheet materials prepared with them have an uncertain shelf life. Other acids used have strong and objectionable odors which handicap their use in commercial products. In contrast to the cyanides of malachite green and brilliant green, setoglaucine cyanide, for example, yields photosensitive solutions and systems that are inherently more stable after exposure and do not fade readily in the dark even without the addition of a stabilizing acid. A solution of setoglaucine cyanide in pure i-propyl alcohol colors on irradiation even more rapidly and strongly than a solution of malachite green cyanide of similar molar concentration. After exposure, if the two solutions are kept in the dark, the color with the malachite green cyanide solution fades away within a few hours (one to four), while that of the setoglaucine cyanide solution does not fade. Thus, 4,4'-bis-amino-2''-halogenated triphenylacetonitriles have the unique property among the basic dye cyanides of forming strongly photosensitive systems that without added acid produce on irradiation a strong blue-green color that does not fade in the dark. The solutions yield on exposure to ultraviolet a color that is more green and less blue than the hues obtainable from the corresponding unhalogenated dye cyanides.

A method for preparing the new compounds is illustrated as follows:

*Example 1*

Fifty grams of commercial Setoglaucine, Colour Index No. 658, 13 g. of 97% sodium cyanide, 100 ml. of acetonitrile and 25 ml. of water are milled together in a mill equipped with glass or ceramic balls until the intense blue color of the dye fades and the mixture has become pasty with precipitated crude organic material, which is collected on a filter, washed with hot water to remove salts, and dried in an oven at 110° C.

Thirty grams of the crude dry product is dissolved in 200 ml. of boiling acetic acid, the hot solution filtered, the filtrate cooled to 20° C. and allowed to stand for 48 hours. The precipitate is collected on a filter, washed with water and dried at 110°. A second crop of less pure material may be precipitated by diluting the filtrate with three volumes of water.

The pure 4,4'-bis-dimethylamino-2''-chloro-triphenylacetonitrile is colorless and crystalline. It decomposes slowly when heated near its melting point and therefore the melting point varies with the speed at which a sample is heated. When heated rapidly it melts above 195° (Corr.) C.

*Analysis.*—Calcd. for $C_{24}H_{24}N_3Cl$: N, 10.78; Cl, 9.09. Found: N, 10.90, 11.01; Cl, 9.58, 9.42.

Other dye cyanide compounds within the general formula I may be prepared in like manner, starting with the corresponding para amino triphenylmethane dye having a halogen atom on a phenyl residue in the 2″ position.

Photosensitive compositions containing the new compounds are prepared by combining the compounds with various activators for hydrophobic dye cyanides. Such activators have been fully disclosed in my Patent Number 2,676,887. Solutions of the new compounds in liquid photo-activators are also photosensitive. Thus, a 2 percent solution of setoglaucine in a lower aliphatic alcohol provides an excellent actinometric solution. The new compounds may be dissolved in or otherwise combined with liquid or solid amides of the aliphatic carboxylic acids which, as more fully described in my copending application Ser. No. 648,791, filed March 27, 1957, provide excellent activators. The activated compositions may be employed to coat or impregnate papers or other suitable base materials to provide photosensitive materials for photographic purposes, actinometry, and the like. Low boiling solvents may be used to facilitate application of the mixtures of activator and dye cyanide to the base material, the solvent then being evaporated by exposure of the sensitized material to air or other drying gases. The sensitized material, upon irradiation with ultraviolet energy produces a strong blue-green color. An example illustrative of the preparation of a sensitized sheet material is as follows:

*Example II*

Paper is impregnated with a solution of 2 grams of setoglaucine cyanide, prepared as described above, in 100 ml. of dimethylacetamide and 500 ml. of acetonitrile. The impregnated paper is air-dried to complete removal of the acetonitrile. The sensitized product is stored in closed containers. On exposure to ultraviolet of wave length shorter than about 3400 A. the paper prints a permanent blue-green image.

This application is a continuation-in-part of my copending application Ser. No. 551,982, filed December 9, 1955, now abandoned.

I claim:

1. A new compound having the formula

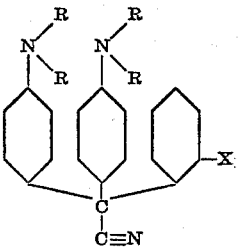

wherein R is a lower alkyl radical and X is a halogen atom.

2. 4,4′ - bis-dimethylamino-2″-chloro-triphenylacetonitrile.

3. A photosensitive composition comprising an intimate admixture of a colorless dye cyanide having the formula

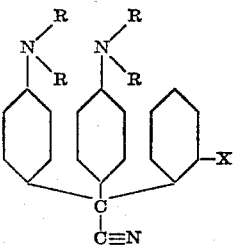

wherein R is a lower alkyl radical and X is a halogen atom, with an organic activator for hydrophobic dye cyanides which renders said admixture photosensitive.

4. The photosensitive composition of claim 3 wherein said colorless dye cyanide is 4,4′-bis-dimethylamino-2″-chloro-triphenylacetonitrile.

5. A photosensitive composition comprising a solution of a colorless dye cyanide having the formula

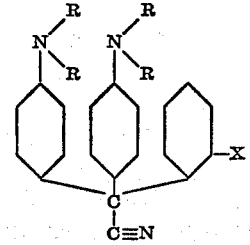

wherein R is a lower alkyl radical and X is a halogen atom, in a liquid organic activator for hydrophobic dye cyanides which renders said solution photosensitive.

6. A photosensitive solution containing 4,4′-bis-dimethylamino - 2″ - chloro - triphenylacetonitrile and an organic activator for hydrophobic dye cyanides which renders said 4,4′-bis-dimethylamino-2″-chloro-triphenylacetonitrile photosensitive.

7. A photosensitive product comprising a supporting base carrying a photosensitive composition containing an intimate admixture of a colorless dye cyanide of the formula

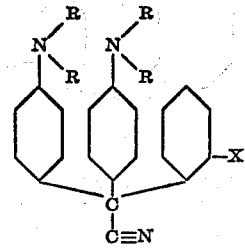

wherein R is a lower alkyl radical and X is a halogen atom, and an organic activator for hydrophobic dye cyanides which renders said admixture photosensitive.

8. The photosensitive product of claim 7 wherein said colorless dye cyanide is 4,4′-bis-dimethylamino-2″-chloro-triphenylacetonitrile.

9. A photochemical process for forming a permanent blue-green color, comprising: exposing to ultraviolet energy of a wave length below about 3400 A. a composition containing 4,4′ - bis-dimethylamino - 2″ - chloro-triphenylacetonitrile and an organic activator for hydrophobic dye cyanides which renders said composition photosensitive.

10. A process for the preparation of a 4,4′-bis-dialkylamino-2″-halogeno-triphenylacetonitrile, comprising reacting with continual grinding a mixture of a 4,4′-bis-dialkylamino-2″-halogeno-triphenylmethane dye and an alkali metal cyanide in a solvent until the color of the dye has substantially disappeared, and recovering the 4,4′-bis-dialkylamino - 2″- halogeno-triphenylacetonitrile from the reaction mixture.

11. A process for the preparation of a 4,4′-bis-dimethylamino-2″-chloro-triphenylacetonitrile, comprising reacting with continual grinding a mixture of Setoglaucine and an alkali metal cyanide in a solvent until the color of the dye has substantially disappeared, and recovering the 4,4′- bis - dimethylamino - 2″- chloro-triphenylacetonitrile product from the reaction mixture.

References Cited in the file of this patent

UNITED STATES PATENTS

| | | |
|---|---|---|
| 2,366,179 | Chalkley | Jan. 2, 1945 |
| 2,441,561 | Chalkley | May 18, 1948 |